United States Patent [19]
Vandierendonck

[11] 3,824,532
[45] July 16, 1974

[54] SEISMIC SIGNAL INTRUSION DETECTION CLASSIFICATION SYSTEM

[75] Inventor: Albert J. Vandierendonck, Minneapolis, Minn.

[73] Assignee: The United States of America as represented by the Secretary of the Air Force, Washington, D.C.

[22] Filed: Sept. 27, 1971

[21] Appl. No.: 184,239

[52] U.S. Cl.................. 340/15, 340/258 D, 340/26
[51] Int. Cl. .......................................... G08b 13/00
[58] Field of Search................. 340/15, 258 D, 261; 181/.5 AP

[56] References Cited
UNITED STATES PATENTS

| | | | |
|---|---|---|---|
| 3,261,009 | 7/1966 | Stetten et al. | 340/261 |
| 3,585,581 | 6/1971 | Aune | 340/261 |
| 3,662,371 | 5/1972 | Lee | 340/261 |
| 3,665,445 | 5/1972 | Riley, Jr. | 340/261 |

Primary Examiner—Richard A. Farley
Assistant Examiner—T. M. Blum
Attorney, Agent, or Firm—Harry A. Herbert, Jr.; Eugene J. Pawlikowsky

[57] ABSTRACT

An intrusion detection system for detecting and classifying intrusions into a protected area by recognizing their characteristic patterns of seismic disturbances. A sensor produces an electrical signal representative of seismic disturbances created by an intrusion. Signals that surpass a predetermined level constitute an event. These signals are introduced to a histogram circuit that operates to determine the time between these events and to transmit a pulse to a classifier indicating each such time. The classifier generates a plurality of analogue signals each of which individually represents by its amplitude the sum of the pulses falling within a particular time between events pattern. Each pattern is characteristic of a particular type of intrusion such as aircraft, ground vehicle, human, nuisance, etc.

5 Claims, 6 Drawing Figures

INVENTOR.
ALBERT J. VANDIERENDONCK

SEISMIC SIGNAL INTRUSION DETECTION CLASSIFICATION SYSTEM

BACKGROUND

The present invention is an improvement in seismic intrusion detection systems.

Prior art seismic intrusion detection systems are capable of distinguishing vehicles from other types of intrusions by recognizing the continuous nature of the seismic disturbance created by vehicles. The seismic disturbance created by an animal, a man, or a nuisance such as rain, wind, or thunder, is not continuous but is instead comprised of groups of high frequency vibrations similar to short duration pulses. Prior systems signal the presence of a man if a prescribed number of pulses occur within a time span. However, the existing systems do not consider the pattern in which the pulses occur as a means of distinguishing the enumerated causes of noncontinuous seismic disturbances. Furthermore, the prior art systems cannot distinguish between the seismic signals caused by ground vehicles and the signals caused by aircraft. Again, an analysis of the pattern of the signal is necessary. Aircraft generate a higher frequency seismic signal than do ground vehicles.

The intrusion detection system described herein operated to detect and classify all seismic disturbances within its range. The present invention identifies the intrusion according to the pattern of seismic disturbances it creates. The intrusion is identified as a ground vehicle, airplane, walking man, running man, animal, or nuisance. The probabilty of a false alarm indicating a human is greatly reduced by the present invention because it discerns the patterns of the seismic disturbances as opposed to prior art systems which merely separate continuous disturbances from noncontinuous ones. Noncontinuous disturbances include animals and nuisance sources as well as humans. The presence of a noncontinuous disturbance does not necessarily indicate the presence of a human.

SUMMARY

The present invention is an intrusion detection system that detects and identifies the intrusion by the seismic disturbance it creates. A distinct pattern of vibrations is created by each type of intrusion or physical event in the protected area. The system disclosed herein employs a sensor that converts the seismic disturbances in a representative voltage signal. A voltage signal that surpasses a prescribed level constitutes an event. A histogram circuit determines the time between successive events through the operation of a shift register, a clock, and a one shot pulse generator. The shift register contains a plurality of stages through which the register is shifted by the clock at prescribed intervals of time. The histogram circuit generates a signal indicative of the stage into which the register last shifted prior to the beginning of an event. To insure that a single event having a duration less than a predetermined length of time does not cause the histogram circuit to generate more than one signal, the one shot pulse generator inhibits the operation of the clock for that predetermined length of time after the beginning of each event. The signals from the histogram circuit are received by a classifier that weights each signal differently in a plurality of integrators. An integrator is used for each class of disturbance desired to be identified. Since each class has a characteristic pattern of vibrations, the integrator for that class weights more heavily the signals from the stages of the histogram circuit that would be pulsed by the vibration pattern associated with that class. As signals are received by the integrator, an analogue signal is produced by the integrator. The amplitude of the analogue signal reflects the number of signals received from the histogram circuit that come within the disturbance pattern of the integrator. At a prescribed time after the last detected event, the decision on the type of intrusion may be made by selecting the highest amplitude analogue signal from the classifier.

A second histogram circuit is employed to discern the intruders that cause continuous seismic signals as opposed to the pulse-like seismic signals characteristic of humans and animals. This histogram circuit detects the time-between-zero-crossings which is the time between amplitude crests in the signal from the sensor. By determining the time-between-zero-crossings, an indication of the frequency of the signal can be obtained since a greater amount of time-between-zero-crossings is indicative of a lower frequency signal. Since aircraft generate a seismic signal of a higher frequency than do ground vehicles, they can be distinguished by the time-between-zero-crossings histogram.

DESCRIPTION OF THE PREFERRED EMBODIMENT

Figure 1:
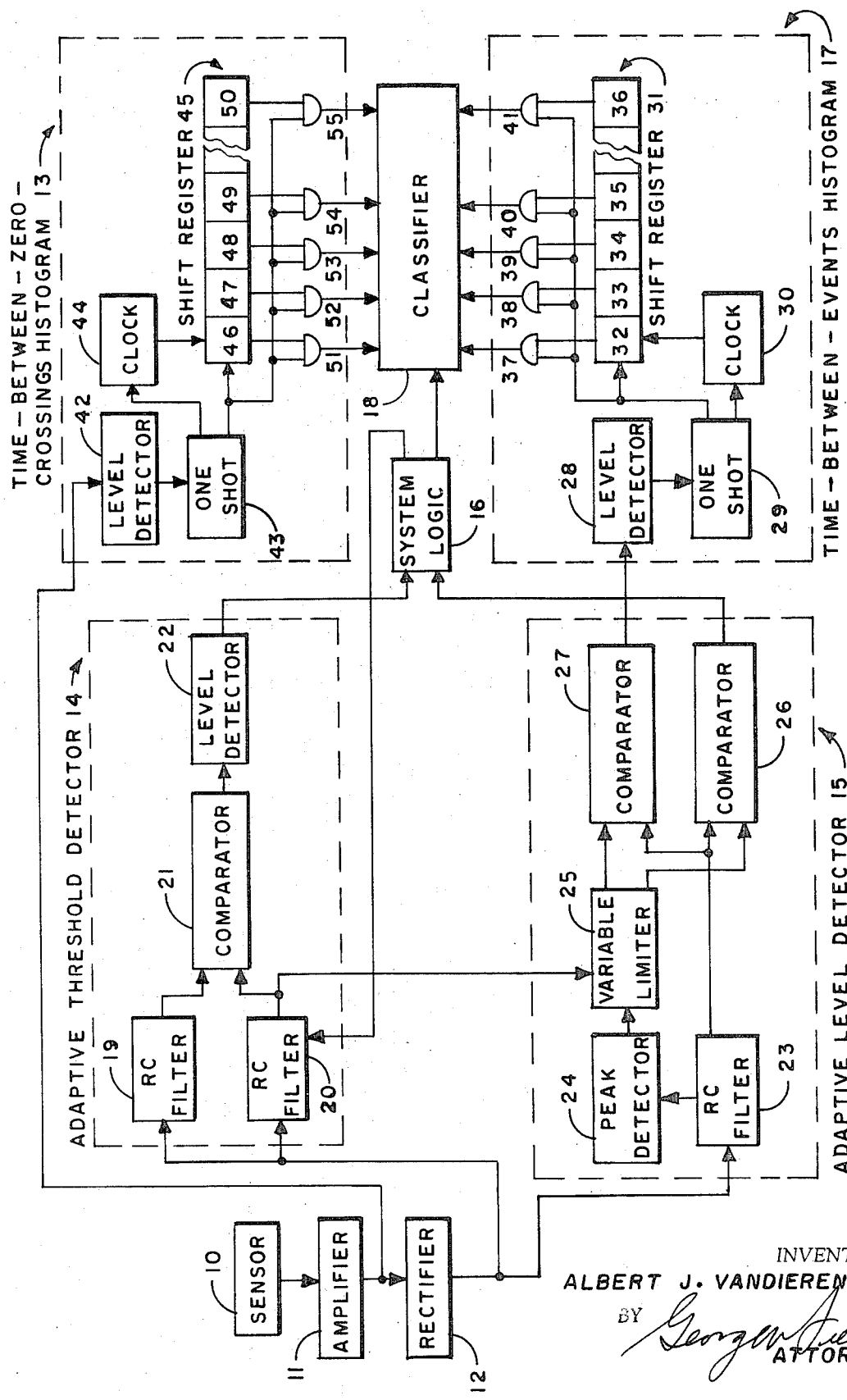
FIG. 1 is a block diagram of a preferred embodiment of the present invention.

Referring to FIG. 1, a seismic sensor 10 is connected to apply an output to a band pass amplifier 11. The output from amplifier 11 is applied to a rectifier 12 and a time-between-zero-crossings histogram circuit 13. Rectifier 12 is connected to drive an adaptive threshold detector 14 and an adaptive level detector 15. A system logic circuit 16 is connected to receive signals from both detector 14 and detector 15. System logic circuit 16 operates to command the operation of the present invention based upon the inputs received from detectors 14 and 15. Also connected to receive signals from detector 15 is a time-between-events histogram circuit 17. Signals from logic circuit 16 are applied to both detector 14 and a classifier 18.

Adaptive threshold detector 14 includes an RC filter 19 and an RC filter 20 which are connected to receive the signal from rectifier 12. Filter 19 has a shorter time constant than does filter 20. A comparator 21 is connected to receive signals from both filter 19 and filter 20. The output from comparator 21 is applied to a level detector 22.

Adaptive level detector 15 includes an RC filter 23 that receives the signal from rectifier 12. The output from filter 23 is applied to peak detector 24 which is connected to drive a variable limiter 25. A comparator 26 is connected to receive signals from both filter 23 and limiter 25. The output of comparator 26 is applied to logic circuit 16. A comparator 27 also receives signals from filter 23 and limiter 25 and applies an output to histogram circuit 17. Variable limiter 25 is also connected to the output of RC filter 20.

Histogram circuit 17 and histogram circuit 13 are identical in structure but distinct in their operation. Histogram circuit 17 includes a level detector 28 connected to receive a signal from comparator 27. A one shot 29 receives the output from detector 28 and drives a clock 30 and a shift register 31. Shift register 31 contains a plurality of stages 32, 33, 34, 35, and 36 through which shift register 31 successively shifts at a prescribed rate. Stages 32, 33, 34, 35, and 36 are connected to the first inputs of AND gates 37, 38, 39, 40, and 41, respectively. The second input of each of AND gates 37 through 41 is connected to receive a signal from one shot 29. Register 31 may contain any desired number of stages. The output from each of AND gates 37 through 41 is connected to classifier 18.

Histogram circuit 13 includes a level detector 42 for receiving output from amplifier 11 and for driving a one shot 43. The output from one shot 43 is applied to a clock 44 and a shift register 45. Register 45 contains a plurality of stages 46, 47, 48, 49, and 50 that are connected to the first inputs of AND gates 51, 52, 53, 54, and 55 respectively. Again, register 45 could contain any desired number of stages. The second input of each of AND gates 51 through 55 is connected to receive a signal from one shot 43. The inputs and AND gates 51 through 55 are connected to classifier 18.

Figure 5:
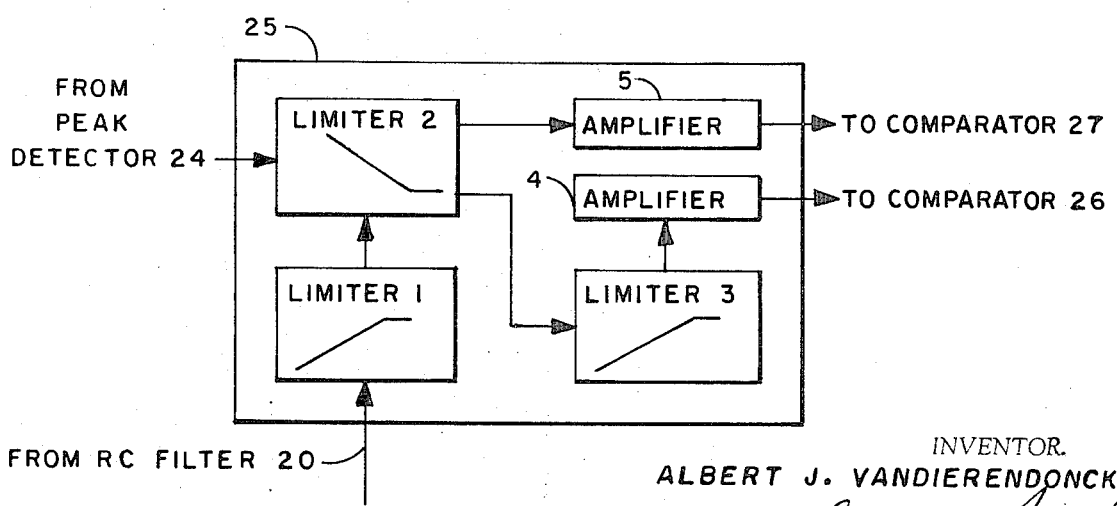
FIG. 5 is a block diagram of variable limiter 25 as shown in FIG. 1.

Referring to FIG. 5, variable limiter 25 is comprised of a limiter 1 that is connected to receive the output from RC filter 20. The output from limiter 1 is connected to a limiter 2 which is connected to receive the output from peak detector 24. The output from limiter 2 is connected to a limiter 3 and an amplifier 5. The output of limiter 3 is connected to an amplifier 4. The outputs of amplifiers 4 and 5 are connected to comparators 26 and 27 respectively.

Figure 6:
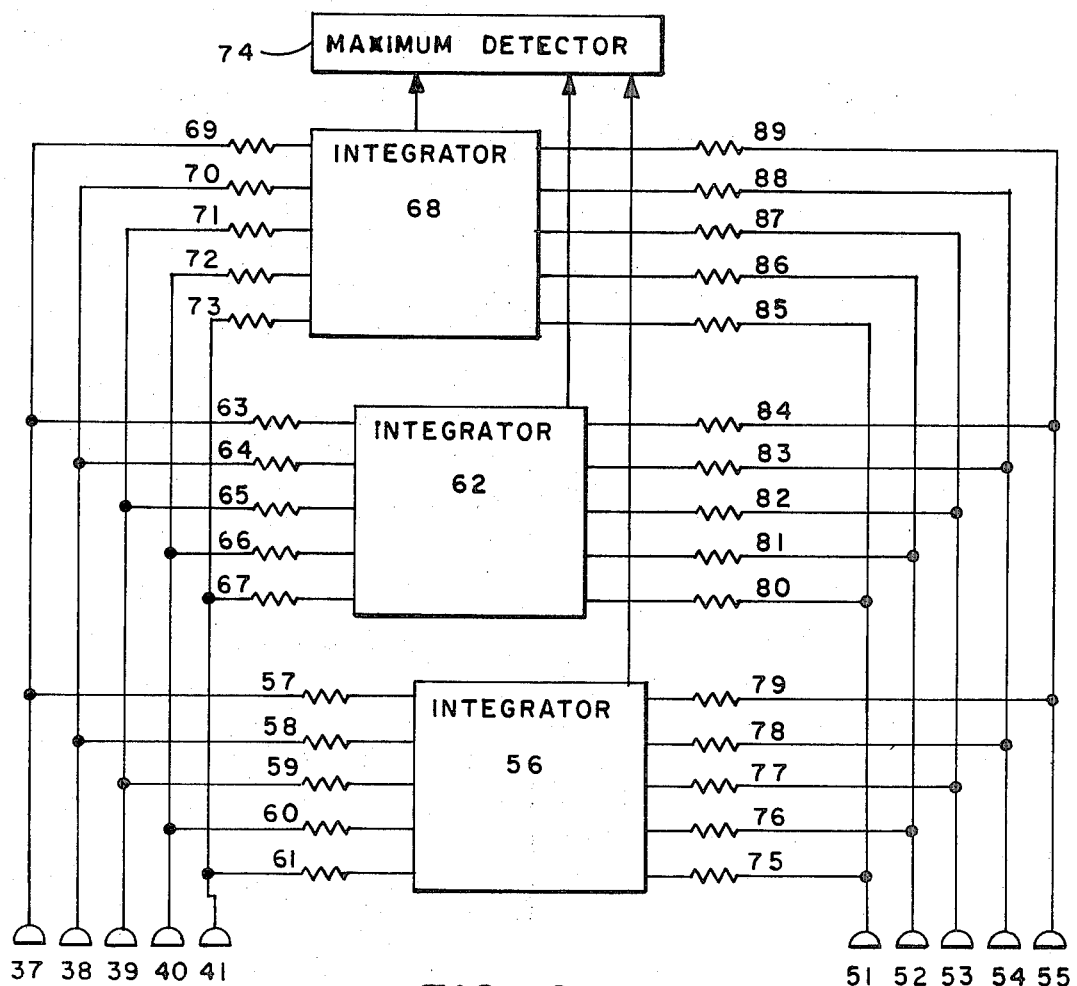
FIG. 6 is a block diagram of classifier 18 as shown in FIG. 1.

Referring to FIG. 6, an integrator 56 is connected to AND gates 37, 38, 39, 40, and 41 via a plurality of resistors 57, 58, 59, 60, and 61 respectively. An integrator 62 is similarly connected to AND gates 37 through 41 via a plurality of resistors 63, 64, 65, 66, and 67. Another integrator 68 is connected in the same manner to AND gates 37 through 41 via a plurality of resistors 69, 70, 71, 72, and 73. The outputs of integrators 56, 62, and 68 are connected to a maximum detector 74.

Integrator 56 is also connected to AND gates 51, 52, 53, 54, and 55 via a plurality of resistors 75, 76, 77, 78, and 79 respectively. Integrator 62 is connected to AND gates 51 through 55 in a similar manner via a plurality of resistors 80, 81, 82, 83, and 84. Likewise, integrator 68 is connected to AND gates 51 through 55 via a plurality of resistors 85, 86, 87, 88, and 89 respectively.

OPERATION

The present invention is a system for detecting the presence of any disturbance that has a characteristic pattern of seismic vibrations. Although this system was designed primarily as an intruder detection system, it would have application in any situation where it is desirable to detect the presence of a particular vibration pattern. Such an application might be the monitoring of the operation of machinery.

The preferred embodiment of the invention shown in FIG. 1 was designed as an intruder detection system. The movement of a vehicle or a human through the area protected by the present invention creates a characteristic seismic vibration within the earth which can be used to identify the intrusion. Referring to FIG. 1, sensor 10 is any sensor capable of producing a signal, preferably electrical, that is representative of the seismic vibration within the sensor's range. The signal from sensor 10 is amplified by amplifier 11, and the output from amplifier 11 is applied to both rectifier 12 and time-between-zero-crossing histogram circuit 13. The operation of histogram circuit 13 will be discussed in a later portion of the specification. The rectified signal from rectifier 12 is transmitted to adaptive threshold detector 14 and adaptive level detector 15. Within adaptive threshold detector 14, RC filters 19 and 20 receive the rectified signal from rectifier 12. RC filter 19 has a shorter time constant than does RC filter 20, so that the output from filter 20 does not rise as fast as the output of filter 19. Comparator 21 receives the outputs from filters 19 and 20 and transmits a signal that is a function of the two outputs of level detector 22. If the signal from comparator 22 indicates that the output from filter 19 exceeds the output from filter 20 by a prescribed amount, level detecotr 22 triggers system logic circuitry 16, thereby causing logic circuitry 16 to reset RC filter 20 and classifier 18. Adaptive threshold detector 14 operates in conjunction with system logic circuitry 16 to reset the system whenever a seismic signal of sufficient strength and of sufficient value above the noise level has been sensed by sensor 10. Threshold detector 14 is adaptive becasue a seismic signal created by an intrusion must exceed the noise level of the signals generated by random disturbances. The adaptive feature is the result of the operation of filters 19 and 20 and prevents a high noise level from triggering system logic circuitry 16.

Figure 2:
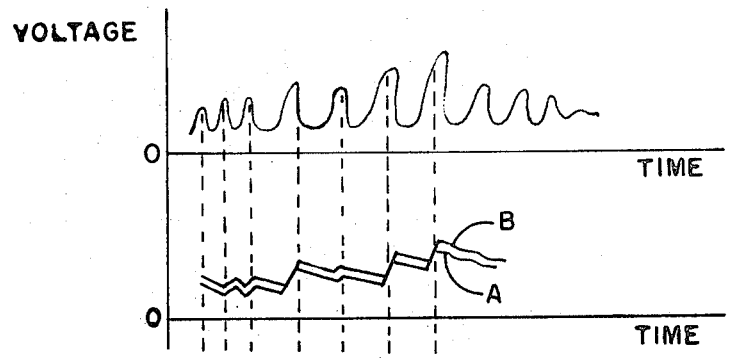
FIG. 2 is a display of certain signals generated within the present invention for analyzing seismic signals.

Adaptive level detector 15 also receives the output from rectifier 12 for the purpose of producing a signal as a function of the rectified output from which information about the disturbance is extracted. RC filter 23 shapes the output from rectifier 12 for the extraction of information by removing fluctuations from the signal to produce a smooth envelope. Peak detector 24 receives the signal from RC filter 23 for the purpose of detecting the signal strength of the output from filter 23, and this signal strength is transmitted to variable limiter 25. As shown in FIG. 5, limiter 2 receives the output from peak detector 24 and limits the low value of that output to prevent level detector 28 from detecting the noise level. The lower limit of variable limiter is based on the output from RC filter 20, and the gain applied to that output is limited by limiter 1. The output of limiter 1 is the lower limit of the output from RC filter 20. Limiter 3 establishes an upper limit on adaptive level B shown in FIG. 2. Level B is established at 0.5 of the output of peak detector 24 by amplifier 4. Of course, any number of voltage levels could be generated by level detector 15 by the addition of more amplifiers similar to amplifier 4. Amplifier 5 establishes voltage level A at 0.7 of the output of peak detector 24. Voltage levels A and B are used in a later stage of the system for extracting information from the signal representative of the seismic disturbance. FIG. 2 shows a typical voltage signal that is introduced to comparators 26 and 27 from variable limiter 25 and RC filter 23. Horizontal lines A and B are voltage levels generated by variable limiter 25. The voltage spikes are the output from RC filter 23. Whenever the voltage spike from filter 23 exceeds adaptive level B, an event has occurred which the system is designed to interpret. Comparator 27 is designed to compare the voltage spike from filter 23 with adaptive level B and is further designed to transmit a signal to level detector 28 that is a function of the comparison between adaptive level B and the voltage spike from filter 23. Comparator 26 compares the voltage spike from filter 23 with adaptive level A from variable limiter 25 and transmits a signal that is a function of that comparison to system logic circuitry 16. If the voltage spike from filter 23 decreases so that it no longer exceeds voltage level A for a prescribed amount of time, comparator 26 transmits a signal to system logic circuitry 16 which then commands classifier 18 to classify the events which have been detected previously and also resets RC filter 20.

Time-between-events histogram circuit 17 receives the signal from comparator 27 via level detector 28. If the signal from comparator 27 indicates that the output from RC filter 23 exceeds adaptive level B, level detector 28 triggers one shot 29 which in turn generates a single pulse. The pulse from one shot 29 is transmitted to clock 30 to disable it for the duration of the pulse. Furthermore, the pulses from one shot 29 are transmitted to AND gates 37 through 41 to enable the gates. The pulse from one shot 29 is also directed to shift register 31 for the purpose of resetting shift register 31 to its initial position in stage 32.

Figure 3:
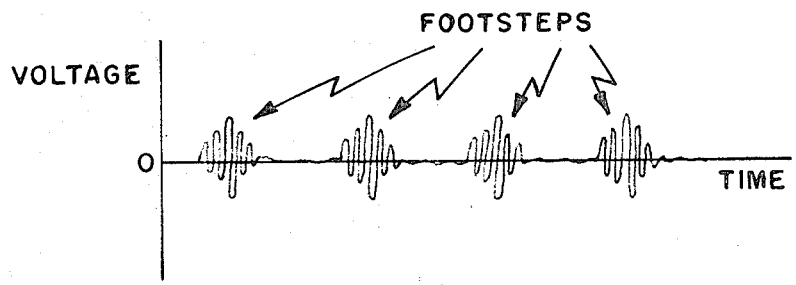
FIG. 3 is a typical seismic signal characteristic of a walking human.
Figure 4:
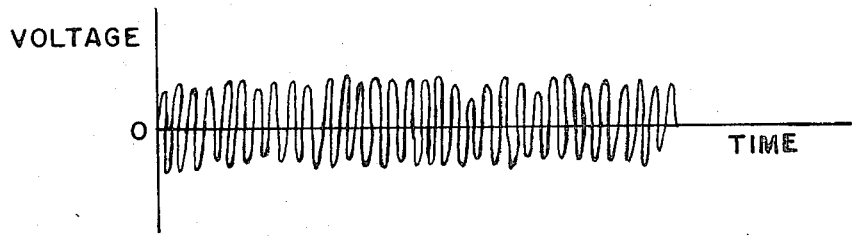
FIG. 4 is a typical seismic signal characteristic of a vehicle.

The reason for having one shot 29 inhibit clock 30 and therefore shift register 31 for a prescribed time is that any seismic pulse disturbance such as a footstep by a human is a high frequency disturbance of significant duration as shown in FIG. 3. Shift register 31 is designed to supply a signal to one of stages 37 through 41 each time an event is detected by level detector 28. If shift register 31 is not inhibited when the event is a disturbance such as a footstep, shift register 31 would produce a pulse for each amplitude crest within the pulse-like disturbance. The disturbance caused by a human footstep ceases while shift register 31 is still inhibited, thereby allowing shift register 31 to count a single pulse for the footstep. Once shift register 31 is no longer inhibited, clock 30 begins shifting register 31 at a prescribed rate through successive stages 37 through 41. Whenever the next event is detected by level detector 28, one shot 29 again directs a pulse to shift register 31 and to clock 30. Shift register 31 generates a signal from the particular stage into which register 31 has shifted at the time the subsequent event occurred. That signal is directed to the particular AND gate that is connected to that stage, and the AND gate having then received two positive signals, one from one shot 29 and the other from the stage that was triggered in shift register 31 by the subsequent event, transmits a signal to classifier 18. After an AND gate has been triggered, shift register 31 is reset at its initial position in stage 37 and clock 30 inhibits the shift register again for a prescribed time. It is this operation which enables histogram circuit 17 to distinguish the seismic disturbance patterns that it receives. If the disturbance is the result of a vehicle, whether that vehicle is a ground vehicle or an airplane, shift register 31 does not proceed beyond initial stage 32 since the continuous signal that is characteristic of the vehicle is immediately present to shift register 31 whenever one shot 29 no longer inhibits clock 30. Therefore, any continuous seismic signal that is primarily characteristic of a vehicle results in shift register 31 triggering AND gate 37, thereby causing AND gate 37 to transmit successive signals to classifier 18. FIG. 4 shows the continuous seismic signal generated by a vehicle.

If the incoming seismic signal is not a continuous signal, then one of subsequent stages 38 through 41 in shift register 31 is triggered by one shot 29. After the initial pulse, shift register 31 is inhibited by one shot 29 as described earlier. At the conclusion of the operation of one shot 29, shift register 31 begins shifting through successive stages 38 through 41. Whenever the next event occurs, that event causes a signal to be sent from whatever stage shift register 31 had shifted to at the time the event occurred. The AND gate connected to that stage sends a signal to classifier 18. Therefore a pulse from AND gate 38 indicates a shorter time between two successive events than does a pulse from AND gate 39. The operation of histogram circuit 17 with respect to particular vibration patterns will be discussed later in the specification.

Time-between-zero-crossings histogram circuit 13 operates in a manner quite similar to histogram circuit 17. Histogram circuit 13 is necessary to enable the system to distinguish ground vehicles from aircraft. The two vehicles differ in their seismic signals in that the frequency of the seismic disturbance created by aircraft is higher than the frequency signal of the seismic disturbance of the ground vehicle. The signal that is introduced to level detector 42 is the actual waveform of the seismic signal that comes from the output of amplifier 11. The output of amplifier 11 is not filtered so that level detector 42 detects each time the voltage signal surpasses the zero level. When this occurs, level detector 42 triggers one shot 43 which generates a pulse having a prescribed duration, and that pulse is transmitted to clock 44, shift register 45, and a plurality of AND gates 51, 52, 53, 54, and 55. The operation of clock 44, shift register 45 and AND gates 46 through 50 is identical to the operation of the same devices in histogram circuit 17. When the first zero crossing occurs in the seismic signal, one shot 43 inhibits clock 44 and also causes shift register 45 to clear itself and return to its initial stage 46. When one shot 43 is no longer inhibiting clock 44, shift register 45 begins shifting through successive stages 47 through 50 until the next zero crossing occurs. At that time, shift register 45 transmits a signal indicating the stage in which the register shifted into at the time of the zero crossing. That signal is transmitted to the AND gate that is connected to that stage in shift register 45 thereby causing that AND gate to send a signal to classifier 18. The signal from that AND gate will indicate the time which elapsed between the two successive zero crossings. Therefore, with high frequency disturbances, the earlier AND gates such as AND gates 46 and 47 are triggered as opposed to the later AND gates 48, 49, 50 being triggered for low frequency seismic disturbances.

Classifier 18 receives information from both histogram circuit 13 and histogram circuit 17 and classifies or identifies the nature of the intrusion by comparing the information from histogram circuits 13 and 17 with predetermined characteristics that are incorporated into the design of classifier 18. Although classifier 18 receives a digital input, classifier 18 generates a plurality of analogue signals, wherein each analogue signal represents by its amplitude the extent of the presence of a particular type of intrusion. In this manner, classifier 18 decides on the nature of the intrusion by selecting the particular analogue signal that has the highest amplitude at the time the seismic signals are no longer being received by sensor 10.

Referring to FIG. 6, each of the analogue signals earlier referred to is developed by one of integrators 56, 62, and 68. The signals received by these integrators are weighted by a plurality of resistors as shown in FIG. 6. In this way, integrators 56, 62, and 68 receive signals of different strength from the same AND gate due to the weighting effect of the resistors. This weighting effect enables each of integrators 56, 62, and 68 to recognize a different pattern of seismic disturbance.

Since integrator 56 is employed to detect the presence of ground vehicles, resistor 57 which links integrator 56 to AND gate 37 weights the signals from AND gate 37 more heavily than resistors 58 through 61 weight the signals from AND gates 38 through 41. This is because the presence of a vehicle will result in a signal from AND gate 37 and not from AND gates 38 through 41.

Likewise, integrator 62 which detects the presence of walking humans receives signals from AND gates 37 through 41 that are weighted differently by resistors 63 through 67. Resistors 63 through 67 weight more heavily the signals from those AND gates in histogram circuit 17 that produce signals indicative of the disturbance pattern created by a walking human. To this end, resistors 63 and 64 may not weight the signals from AND gates 37 and 38 as heavily as resistors 65 and 66 may weight the signals from AND gates 39 and 40. Of course, which AND gates are weighted more heavily for the disturbance pattern of a walking human depends upon the speed with which shift register 31 is shifted by clock 30.

Integrator 68 is employed to detect a nuisance class of disturbances, and resistors 69 through 73 may be of equal value so that the signals from AND gates 37 through 41 are equally weighted. In this way, the signals from AND gates 37 and 41 that do not fall within any prescribed pattern are summed by integrator 68, thereby causing integrator 68 to produce an analogue signal that may indicate that no particular pattern of seismic disturbance is present although extensive seismic disturbances are present in the vicinity of the sensor.

Integrators 56, 62, and 68 also receive signals from AND gates 51 through 55 that are weighted by resistors 75 through 79, resistors 80 through 84, and resistors 85 through 89 respectively to further enable the classification of the intrusions. Since integrator 56 is used to detect ground vehicles, resistors 77, 78, and 79 weight the signals from AND gates 53, 54, and 55 more heavily than resistors 75 and 76 weight the signals from AND gates 51 and 52. Therefore, the low frequency seismic disturbance characteristic of ground vehicles results in a high amplitude analogue signal from integrator 56 than does the high frequency disturbance caused by aircraft. Just the opposite is true of the weighting effect of resistors 85 through 89 on signals to integrator 68 from AND gates 51 through 55. Since aircraft are considered a nuisance, resistors 85 and 86 weight heavily the signals from AND gates 51 and 52 that are caused by the high frequency disturbance of aircraft.

Resistors 80 through 84 weight the signals received by integrator 62 from AND gates 51 through 55 according to which of those signals are representative of the frequency of the disturbance caused by walking humans.

The output from integrators 56, 62, and 68 are connected to maximum detector 74 which operates to decide the nature of the intrusion as sensed by sensor 10 by selecting the analogue signal having the highest amplitude at the time the seismic signals are no longer being received by sensor 10. The decision by maximum detector 74 may be employed to activate any desired system such as a defensive system or alarm system. Of course, additional integrators and resistors may be employed with the present invention to enable it to detect additional patterns of seismic disturbance.

The preceding description of the preferred embodiment contains a small number of stages within each of shift registers 31 and 45. However, any desired number of stages may be employed in register 31 and 45.

Although the preferred embodiment described herein was designed primarily as an intrusion detection system, the present invention may find application anywhere that it is useful to monitor an area or machine through an analysis of prescribed vibration patterns.

I claim as my invention:

1. Apparatus for distinguishing a plurality of physical disturbances having characteristic vibration patterns through a time analysis of said patterns comprising:

a sensor for generating a voltage signal representative of a vibration;

a level detector for receiving said voltage signal, said level detector being responsive to each said voltage signal exceeding a prescribed threshold for generating a plurality of first pulses;

a one shot pulse generator for generating a plurality of second pulses each having a predetermined duration in response to said first pulses from said level detector;

a clock connected to receive said second pulses, said clock being inhibited from operating throughout the duration of said second pulses;

a shift register having a plurality of stages, said shift register being connected to said clock for shifting through said plurality of stages in response to the operation of said clock; said shift register also being connected to receive said second pulses for producing an output signal from one of said plurality of stages into which said register shifted prior to said second pulses, said register being further responsive to said second pulses for resetting at an initial stage in said plurality of stages in preparation for a succeeding one of said second pulses, thereby enabling said register to discern the time between each of said second pulses and a succeeding one of said second pulses; and a classifier connected to said shift register and including a plurality of summing integrators and supervisory means connected to receive the outputs thereof, each summing integrator including weighting resistors connected to individual stages of said register whereby an output signal from a stage may be made of different effect in different integrators.

2. The apparatus of claim 1 and a rectifier connected between said sensor and said level detector.

3. The apparatus of claim 2 and an adaptive level detector connected between said rectifier and said level detector comprising:
- a filter for smoothing the envelope of said voltage signal;
- a peak detector for detecting the peak amplitude of said voltage signal from said filter;
- a variable limiter for producing at least one voltage level as a function of said peak amplitude; and
- a comparator for comparing said voltage signal to said voltage level, said comparator being connected to said level detector.

4. The apparatus of claim 1 and a time-between-zero-crossings histogram circuit connected to receive said voltage signal from said sensor, said time-between-zero-crossings histrogram circuit being responsive to each positive zero value crossing by said voltage signal for transmitting a second output signal to said classifier indicating the time between each said zero value crossing and a successive zero value crossing by said voltage signal, thereby enabling said classifier to discern the frequency of said voltage signal.

5. The apparatus of claim 2 and a threshold detector responsive to the output of said rectifier comprising:
- a first RC filter connected to produce a first signal in response to said voltage signal from said rectifier, said first RC filter having a set time constant;
- a second RC filter connected to produce a second signal in response to said voltage signal from said rectifier, said second RC filter having a time constant different to the time constant of said first RC filter;
- first means for comparing said first and second signals, said first means being operative to produce a third signal indicative of the difference between said first and second signals; and
- second means for initiating power to said apparatus in response to said third signal exceeding a predetermined value.

* * * * *